Aug. 14, 1956  S. E. MANECKE  2,759,068
POSITIVE OFF THERMOSTAT
Filed Nov. 1, 1954
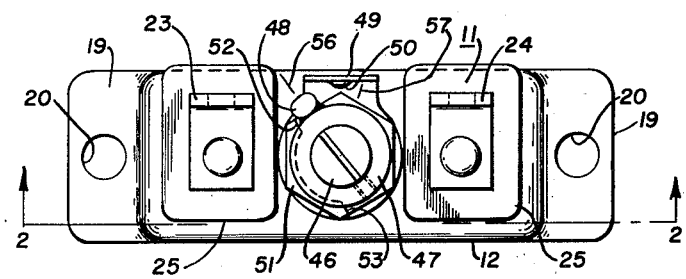
Fig. 1
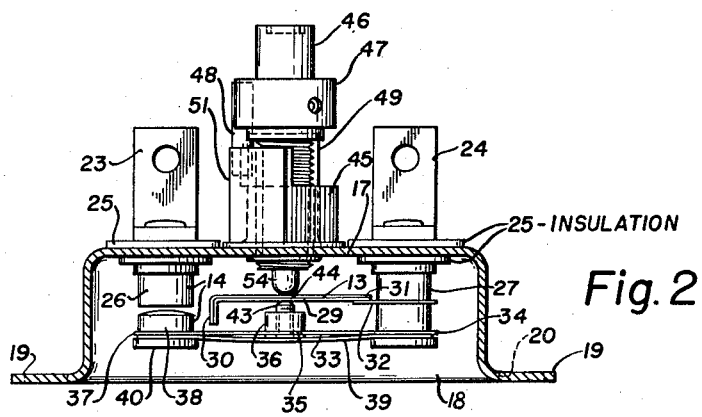
Fig. 2
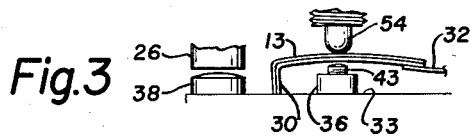
Fig. 3
Fig. 4
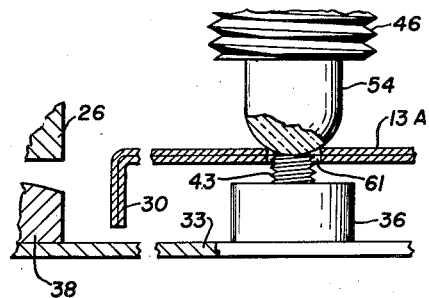
Fig. 6
Fig. 5
INVENTOR.
SIEGFRIED E. MANECKE
BY Woodling and Krost,
attys.
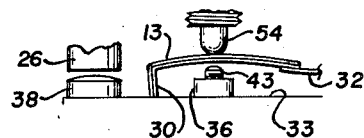

United States Patent Office 2,759,068
Patented Aug. 14, 1956

2,759,068

POSITIVE OFF THERMOSTAT

Siegfried E. Manecke, Mansfield, Ohio, assignor to Stevens Manufacturing Company, Inc., a corporation of Ohio Application November 1, 1954, Serial No. 465,836

20 Claims. (Cl. 200—138)

The invention relates in general to temperature responsive switches and more particularly to a simple form of thermostatic switch which has a position of adjustment giving a positive off condition.

Thermostatic switches are commonly used to control the amount of electrical energy flowing to an electrical device creating heat with the heat of the device affecting the thermostatic switch to open a set of contacts and thus cease the production of heat. Alternatively, of course, the device may be some form of refrigeration device with the electrical contacts opening upon a desired reduction of temperature and thus shutting off the refrigeration system. In many thermostats an adjusting screw is provided to move a first contact and a bimetallic member or other temperature responsive member positions a second contact. The first and second contacts mutually cooperate and thus the adjusting screw can vary the temperature at which the bimetallic member is effective to move the contacts to the open condition and thus shut off the supply of heat. In such prior art form of thermostat there has also on occasions been incorporated a deflecting member which deflects either the bimetallic member or the flexible member carrying the second contact to a position whereat the first contact cannot mutually engage the second contact for one position of the adjusting screw, no matter what is the ambient temperature of the bimetallic member. Such prior art thermostats, however, have the disadvantage that they are of the so-called creep action type wherein the contacts are moved relatively slowly by the bimetallic member and also provision must be made for both contacts to be movable.

Therefore, an object of the present invention is to provide a positive off thermostat in a design wherein only a single contact is movable.

Another object of the invention is to provide a simple and reliable thermostat having only a single movable operating portion.

Another object of the invention is to provide three different means to move a contact or other operating member.

Still another object of the invention is to provide a thermostat or condition responsive device wherein all adjustments and movements are effected on a single contact or operating portion of the device.

Another object of the invention is to provide a thermostatic device having a flexible member wherein first and second adjustable forces are applied in opposite directions on the flexible member at approximately the same point.

Another object of the invention is to provide a flexible member for a thermostat wherein adjustable forces are applied generally in opposition to the flexible member at points whereat the member is sufficiently stiff between the points to have substantially no deflection therebetween.

Another object of the invention is to provide a flexible member which is moved by three different forces with two being in opposition generally at one location and a third force being at a different location.

Another object of the invention is to provide a thermostat having a bimetallic flexible member with first and second screws acting in opposition on the mid-portion thereof and with another portion of the bimetallic member being operative to move a contact of the thermostat.

Another object of the invention is to provide an adjustable abutment in a thermostat which for at least one position of the manual adjusting screw moves a contact of the thermostat to a position whereat it would be moved by movement of the thermostat bimetal through a first temperature range and thus providing a positive off condition of the thermostat.

Another object of the invention is to provide in a thermostat an abutting relationship with a bimetallic member at two different locations and with forces acting generally in opposition at one of these two locations.

Other objects and a fuller understanding of this invention may be had by referring to the following description and claims, taken in conjunction with the accompanying drawings, in which:

Figure 1 is a plan view of a thermostat constructed in accordance with this invention;

Figure 2 is a sectional elevational view on the line 2—2 of Figure 1;

Figure 3 is a partial view of the thermostat adjusted for a low temperature setting;

Figure 4 is a partial view of the thermostat adjusted for a high temperature setting;

Figure 5 is a partial view of the thermostat adjusted for a high temperature setting and at a high temperature; and Figure 6 is an enlarged sectional view of a portion of a modified form of thermostat.

The figures 1 and 2 show the general construction of the thermostat 11 which includes generally an enclosing housing or base 12, the temperature responsive member or bimetallic member 13, and the contact means 14. The bimetallic member 13 may be considered as a member responsive to a variable condition, in this case variations in the ambient temperature. The contact means 14 may be considered as operating portions which are the primary things to be actuated or operated by the bimetallic member 13.

The housing 12 has a closed end 17 and an open end 18. Mounting flanges 19 are provided on the housing 12 with mounting holes 20 so that the entire thermostat 11 may be mounted to the electrical appliance which is to be controlled. The entire housing with the one open end 18 assures that heat may be introduced into the housing so as to quickly affect the bimetallic member 13.

First and second terminals 23 and 24 are mounted on the closed end 17 with each being separately insulated by insulating washers 25. The terminals extend through the closed end 17 and a first or stationary contact 26 is mechanically and electrically connected to the first terminal 23. Similarly, a post or stack 27 is mechanically and electrically connected to the second terminal 24 on the inside of the housing 12.

The bimetallic member 13 is generally L-shaped and has a long leg or main portion 29 and a short leg or extension 30 which is generally at right angles to the long leg 29. A first portion 31 of the bimetallic member 13 is fastened as by welding to a spring hinge member 32 which is mounted in the stack 27. This spring hinge member 32 may be made thinner than the bimetallic member and also cut away so as to provide a satisfactorily flexible hinge. A flexible contact strip 33 is also provided with a first portion 34 thereof mounted in the stack 27. A second or mid-portion 35 of the strip 33 carries a nut 36 and a third or end portion 37 carries a movable contact 38 which is a part of the contact means 14. A current carrying strip 39 may also be used, if desired, to decrease the heat generated in the contact strip 33 for the passage of current therethrough. This current carrying strip may be of suitable material such as copper and may be fastened at each end into the stack 27 and to the contact 38 as by the rivet 40.

The nut 36 receives an abutment screw 43 which may be adjusted from the open end 18 of the housing by suitable apertures in the strips 33 and 39. The abutment screw 43 is adapted to abut a mid-portion or second portion 44 of the bimetallic member 13. The closed end 17 of the housing 12 has a nut 45 fastened thereto as by staking, and a manual adjusting screw 46 is received in the nut 45. A detent collar 47 is fastened to the screw 46 and carries a detent bar 48 cooperating with a detent spring 49. This detent spring is fastened between the nut 45 and housing 12 and has a detent dimple 50 which cooperates with the bar 48 to give a tactile indication to the thermostat operator that the adjusting screw has moved past a particular rotational position. The nut 45 also incorporates an extension 51, the opposite ends 52 and 53 of which act as rotational limit stops for the adjusting screw 46 by cooperating with the detent bar 48. The lower end of the adjusting screw 46 carries an insulator tip 54 which bears against the mid-portion 44 of the bimetallic member 13 at a point generally opposite the abutment screw 43.

The contact member 33 has a normal resiliency tending to urge it upwardly, as viewed in Figure 2; and the bimetallic member 13 has a normal resiliency also urging it upwardly or at least not to exert any appreciable downward force on the contact member 33. This may be seen in Figure 4 which is a drawing of the thermostat at normal temperatures but adjusted for a high temperature setting.

Operation

The Figures 1 and 2 show the thermostat 11 adjusted for the positive off condition and with the thermostat at normal room temperature or under the normal ambient temperature conditions of the environment in which the thermostat is used. The detent bar 48 may be considered as an indicator; and when it is positioned adjacent the mark or indicia 56, the thermostat is in the off condition which in this case, as shown in Figure 2, means that the contact means 14 are out of engagement.

The position of the detent dimple 50 may be considered a dividing line between a first and a second temperature range. The first temperature range lies between the detent dimple 50 and the indicia 56, whereas the second temperature range lies between the detent dimple 50 and the rotational limit stop 53. If the detent bar 48 is positioned adjacent the indicia 57, this would be a low temperature setting of the thermostat, assuming that the thermostat controls a heating appliance. This would be as shown in Figure 3. With the detent bar adjacent the rotational limit 53, the thermostat is adjusted for a high temperature setting. This is the condition shown in Figure 4 because the left-hand thread on the adjusting screw 46 has moved upwardly as viewed in Figure 4.

The thermostat 11 may be referred to as a semi-snap action thermostat since the contacts do not open with a creep action but open with a relatively rapid movement which characterizes it as a semi-snap acting thermostatic switch. This may be seen by referring to Figure 3 wherein the thermostat has been adjusted to a low temperature setting, that is, the detent bar 48 is opposite the indicia 57 and also the electrical appliance has so heated the thermostat 11 so as to cause a slight curvature of the bimetallic member 13 which has opened the contact means 14. With the thermostat at the low temperature setting 57 the adjusting screw 46 has moved upward from that shown in Figure 2 so as to permit closing of the contacts 26 and 38. The comparison of Figures 2 and 3 will show that in the normal or cold condition of the thermostat the bimetallic member long leg 29 is substantially straight with the short leg 30 generally at right angles thereto and positioned quite close to the contacts 26 and 38. As the thermostat warms up, the bimetallic member 13 arches upwardly in the middle and the mid-portion 44 abuts the insulator tip 54 thus causing the short leg 30 to move downwardly. This action is that which opens the contacts. However, at the same time the arching of the entire bimetallic member 13 causes movement toward the right of the extreme end of the short leg 30, and this is a scraping movement along the contact strip 33. This scraping movement must first overcome the static friction of the abutment between the short leg 30 and contact strip 33; and when such static friction is overcome, the short leg 30 moves to expend the stored energy therein and this gives the semi-snap opening of the contact means 14.

The abutment screw 43 is adjusted initially and then it is generally retained in a particular position during all usage of the thermostat. The abutment screw 43 is so adjusted that when the adjusting screw 46 is in the positive off position 56, the two screws so cooperate with the bimetallic member 13 and with the contact strip 33 so as to move the contacts 26 and 38 out of engagement. This is as shown in Figure 2. The abutment screw 43 must also be so adjusted that for the low temperature setting 57 at the normal temperature of the thermostat the contacts 26 and 38 are in engagement. This will then cause heating of the electrical appliance to that low temperature setting, and thus the contacts will be opened by deflection of the bimetallic member 13 as shown in Figure 3.

The Figures 4 and 5 show the thermostat adjusted for a high temperature condition at which point it will be noted that the adjustment screw 46 is moved vertically upwardly away from the bimetallic member 13. The Figure 4 shows the thermostat in normal or cold temperatures, and hence, with the contacts closed; whereas the Figure 5 shows the same temperature setting with the bimetallic member 13 considerably deflected to the position it assumes at such high temperature, and hence, the mid-portion 44 of the bimetallic member abuts the insulating tip 54 to cause the short leg 30 to move downwardly sufficiently to open the contact means 14. It will be noted that if the adjusting screw 46 is moved downwardly to the positive off position 56 with the thermostat at the high temperature of Figure 5, this will give a large separation of the contacts 26 and 38. Upon cooling of the bimetallic member 13, the thermostat will return to the condition shown in Figure 2 at which time the contacts 26 and 38 remain out of engagement and thus for any and all temperatures of the bimetallic member 13, when the adjusting screw 46 is in the positive off position 56, the contacts 26 and 38 always remain out of engagement.

The adjusting screw 46 and abutment screw 43 are adjustable forces acting in opposite directions generally at the mid-point of the bimetallic member 13 and preferably act along the same axis; however, the axes of these two screws may be displaced slightly and still the bimetallic member 13 will be sufficiently stiff between the points of application of the forces so that there is not appreciable deflection of the bimetallic member between these points of force application. The force of the adjusting screw 46 in the positive off position 56 is transmitted through the bimetallic member 13 to the abutment screw 43 and to the contact strip 33, so that the contact means 14 are moved out of engagement despite any deflectional changes in the bimetallic member 13 as caused by temperature variations. Thus, the two screws 46 and 43 may be considered as establishing forces in opposite directions on the mid-portion of the contact strip 5. Also, the short leg 30 provides an abutting force on the contact strip 33 and closely adjacent the contact 38. And thus, three separate movable forces are applied on the contact strip 33.

The Figure 6 shows a modification wherein a bimetallic member 13A is used which has a small clearance hole 61 therein. The insulator tip 54 is larger than the hole 61 and hence engages the bimetallic member 13A whereas the abutment screw 43 is small enough to pass through the hole 61 to abut the insulator tip 54. The operation of this modified form of thermostat of Figure 6 may be essentially the same as that for Figures 1 through 5, and is shown in the positive off position similar to that of Figure 2. The adjusting screw 46 for the modification of Figure 6 would still move the contact 38 up and down and the abutment screw 43 would also move the contact 38 up and down. Further, the short leg 30 of the bimetallic member 13A would still be deflected by temperature changes to move the contact 38 to the open condition.

Thus, in Figure 6 the adjusting screw 46 would be a first means to adjust the position of the contact 38 relative to the base and to adjust the mid-portion of the bimetallic member 13A relative to the base or housing 12. Also, the abutment screw 43 would be a second means to adjust the position of the contact 38 relative to the base or housing 12. Again, the bimetallic member 13A would also be available to position the contact 38 by temperature changes. Therefore, in Figure 6 there also are three separate movable forces which may be applied to the contact strip 33 and/or the contact 38.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A condition responsive device comprising a base, an operating portion movably cooperating with said base, a movable condition responsive member, means for mounting said condition responsive member to said base, first means for adjustably moving said condition responsive member in a first direction, second means for moving said condition responsive member in the opposite direction, means for causing said condition responsive member to move said operating portion, and said first means having at least one adjustment position whereat said condition responsive member is ineffective to change the condition of said operating portion.

2. A condition responsive device comprising a base, an operating portion movably cooperating with said base, a movable condition responsive member, means for mounting said condition responsive member to said base, first means for adjustably moving said condition responsive member in a first direction, second means for moving said condition responsive member in the opposite direction, means for causing said condition responsive member to move said operating portion, said first means having at least one adjustment position whereat said condition responsive member is ineffective to change the condition of said operating portion, and said first means, said condition responsive member, and said operating portion so mutually cooperating that adjustment of said first means changes the relative position of said operating portion and said first means to vary the amount of deflection with condition variations of said condition responsive member required to operably move said operating portion.

3. A thermostat comprising a base, an operating portion movably cooperating with said base, a temperature responsive member having first, second, and third portions, means for mounting said first portion to said base, first means for adjustably moving said temperature responsive member second portion in a first direction, second means for moving said operating portion in the opposite direction, means for causing said third portion to move said operating portion, said first means having at least one adjustment position whereat said temperature responsive member is ineffective to change the condition of said operating portion, and said first means, said temperature responsive member, and operating portion so mutually cooperating that adjustment of said first means changes the relative position of said operating portion and said first means to vary the amount of deflection with temperature of said temperature responsive member required to operably move said operating portion.

4. A positive off thermostat comprising a base, a contact movably cooperating with said base, a bimetallic member having first, second, and third portions, means for mounting said first portion to said base, first means for adjustably moving said bimetallic member second portion in a first direction, second means for moving said bimetallic member second portion in the opposite direction, said bimetallic member adapted to deflect in a given direction upon temperature variations in a given sense throughout first and second temperature ranges, means for causing said contact to be moved by said bimetallic member as it is moved in said second temperature range, and at least one position of said first means cooperating with said second means and said contact to move said contact from a first to a second position, said positional movement of said contact being in the same direction and of substantially the same degree of deflection as the deflection of said bimetallic member during temperature variations in said given sense through said first temperature range.

5. A positive off thermostat comprising a base, a contact movably cooperating with said base, a bimetallic member having first, second, and third portions, means for mounting said first portion to said base, first means for adjustably moving said bimetallic member second portion in a first direction, second means for moving said bimetallic member second portion in the opposite direction, means for causing said third portion to move said contact, said first means having at least one adjustment position whereat said bimetallic member is ineffective to move said contact, and said first means, bimetallic member, and contact so mutually cooperating that adjustment of said first means changes the relative position of said bimetallic member third portion and said first means to vary the amount of deflection with temperature of said bimetallic member required to operably move said contact.

6. A device, comprising, a base, a flexible member having first, second, and third portions, an operating portion carried on said flexible member third portion for cooperation with said base, a condition responsive member having first, second, and third portions, means for mounting both said first portions to said base, means for providing a cooperating relationship between said third portions for movement of said operating portion upon changes of said condition, first adjustable means operating on one of said member second portions for selecting the operating condition of said device, second adjustable means coacting between said member second portions, and said first and second adjustable means acting in opposite directions on said one of said member second portions.

7. A thermostat, comprising, a base, a flexible member having first, second, and third portions, a movable contact carried on said flexible member third portion for cooperation with said base, a temperature responsive member having first, second, and third portions, means for mounting both said first portions to said base, means for providing a cooperating relationship between said third portions for movement of said movable contact upon temperature changes, first adjustable means operating on one of said member second portions for selecting the operating temperature of said thermostat, second adjustable means coacting between said member second portions, and said first and second adjustable means acting in opposite directions on points of said one of said member second portions whereat said one of said members is sufficiently stiff between said points to have substantially no deflection therebetween.

8. A positive off thermostat, comprising, a base, a flexible member having first, second, and third portions, an operating portion on said flexible member third portion for cooperation with said base, a temperature responsive member having first, second, and third portions, means for mounting both said first portions to said base, means for providing an abutting relationship between said third portions for movement of said operating portion upon temperature changes, first adjustable means coacting between said base and one of said member second portions for selecting the operating temperature of said thermostat, second adjustable means coacting between said member second portions to establish a positive off condition of said thermostat operating portion at least at one adjustment position of said first adjustable means for all positions of said temperature responsive member, and said first and second adjustable means acting in opposite directions on points of said one of said member second portions whereat said one of said members is sufficiently stiff between said points to have substantially no deflection therebetween.

9. A positive off thermostat, comprising, a base, a flexible member having first, second, and third portions, an operating portion on said flexible member third portion for cooperation with said base, a temperature responsive member having first, second, and third portions, means for mounting both said first portions to said base, means for providing an abutting relationship between said third portions for movement of said operating portion upon temperature changes, first adjustable means coacting between said base and one of said member second portions for selecting the operating temperature of said thermostat, second adjustable means coacting between said member second portions to establish a positive off condition of said thermostat operating portion at least at one adjustment position of said first adjustable means for all positions of said temperature responsive member, and said first and second adjustable means acting in opposite directions on points of said temperature responsive member second portion whereat said temperature responsive member is sufficiently stiff between said points to have substantially no deflection therebetween.

10. A positive off thermostat, comprising, a base, first and second terminals mutually insulated and mounted on said base, a stationary contact, a first flexible member having first, second, and third portions, a movable contact carried on said first flexible member third portion for cooperation with said stationary contact, means for electrically connecting said first and second terminals to said movable and stationary contacts, respectively, a temperature responsive member having first, second, and third portions, means for fixedly mounting both said first portions to said base, means for providing an abutting relationship between said third portions for movement of said movable contact upon temperature changes, first adjustable means coacting between said base and one of said member second portions for selecting the operating temperature of said thermostat, second adjustable means coacting between said member second portions to establish an open condition of said contacts at least at one adjustment position of said first adjustable means for all positions of said temperature responsive member, and said first and second adjustable means acting in opposite directions on points of said one of said member second portions whereat said one of said member second portions is sufficiently stiff between said points to have substantially no deflection therebetween.

11. A positive off thermostat, comprising, a base, first and second terminals mutually insulated and mounted on said base, a stationary contact, a first flexible member having first, second, and third portions, a movable contact carried on said first flexible member third portion for cooperation with said stationary contact, means for electrically connecting said first and second terminals to said movable and stationary contacts, respectively, a temperature responsive member having first, second, and third portions, means for fixedly mounting both said first portions to said base, means for providing an abutting relationship between said third portions for movement of said movable contact upon temperature changes, first adjustable means coacting between said base and one of said member second portions for selecting the operating temperature of said thermostat, second adjustable means coacting between said member second portions to establish an open condition of said contacts at least at one adjustment position of said first adjustable means for all positions of said temperature responsive member, and said first and second adjustable means acting in opposite directions on points of said temperature responsive member second portion whereat said temperature responsive member is sufficiently stiff between said points to have substantially no deflection therebetween.

12. A positive off thermostat, comprising, an enclosing housing having an open end and a closed end, first and second terminals mutually insulated and mounted through said closed end, a stationary contact, a first flexible member having first, second, and third portions, a movable contact carried on said first flexible member third portion for cooperation with said stationary contact, means for electrically connecting within said housing said first and second terminals to said movable and stationary contacts, respectively, a temperature responsive member having first, second, and third portions, means for fixedly mounting both of said first portions to said housing closed end, means for providing an abutting relationship between said third portions for movement of said movable contact upon temperature changes, first adjustable means operating on said temperature responsive member second portion for selecting the operating temperature of said thermostat, second adjustable means coacting between said member second portions to establish an open condition of said contacts at least at one adjustment position of said first adjustable means, and said first and second adjustable means acting on opposite sides of said temperature responsive member and being at locations thereon whereat said temperature responsive means is sufficiently stiff to have substantially no deflection therebetween.

13. A positive off thermostat, comprising, a base, first and second terminals mutually insulated and mounted on said base, a first contact connected to said first terminal, a bimetallic member having a main portion and an extension transverse thereto, a flexible contact member, means for mounting said contact member to said second terminal, means for mounting said bimetallic member to one of said contact members and said second terminal with said extension in close proximity to said first contact, a movable contact moved by said contact member for cooperation with said first contact, an abutment screw adjustably carried by the mid-portion of one of said contact and bimetallic members for adjustable abutment with the mid-portion of the other thereof, an adjusting screw threadably carried on said base, insulator means carried between said adjusting screw and one of said contact and bimetallic members at a location generally opposite said abutment screw, stop means coacting between said adjusting screw and said base to establish first and second rotational limit positions of said adjusting screw, a given rotational position of said adjusting screw establishing a dividing line between first and second adjustment ranges, said first adjustment range being between said given and said first rotational position and constituting an off condition with said contacts out of engagement, said adjusting screw being operable throughout said second adjustment range to establish the operating temperature at which said contacts are moved by said bimetallic member to the closed condition, and said bimetallic member extension adapted to abut said contact member at a location closely adjacent said movable contact within said second adjustment range with temperature changes in a given sense.

14. A positive off thermostat, comprising, a base, first and second terminals mutually insulated and mounted on said base, a first contact connected to said first terminal, a bimetallic member having a main portion and an extension transverse thereto, a flexible contact member, means for mounting said contact member to said second terminal, means for mounting said bimetallic member to one of said contact members and said second terminal with said extension in close proximity to said first contact, a movable contact moved by said contact member for cooperation with said first contact, an abutment screw adjustably carried by the mid-portion of one of said contact and bimetallic members for adjustable abutment with the mid-portion of the other thereof, an adjusting screw threadably carried on said base, insulator means carried between said adjusting screw and said bimetallic member main portion at a location generally opposite said abutment screw, stop means coacting between said adjusting screw and said base to establish first and second rotational limit positions of said adjusting screw, a given rotational position of said adjusting screw establishing a dividing line between first and second adjustment ranges, said first adjustment range being between said given and said first rotational positions and constituting an off condition with said contacts out of engagement, said adjusting screw being operable throughout said second adjustment range to establish the operating temperature at which said contacts are moved by said bimetallic member to the closed condition, and said bimetallic member extension adapted to abut said contact member at a location closely adjacent said movable contact within said second adjustment range with temperature changes in a given sense.

15. A positive off thermostat, comprising, a base, first and second terminals insulatively mounted on said base, a first contact connected to said first terminal, a bimetallic member having a main portion and an extension transverse thereto, a flexible contact strip having first and second ends, means for mounting said strip first end to said second terminal with said strip second end extending toward said first contact, means for mounting said bimetallic member to one of said contact strip and said second terminal with said extension in close proximity to said first contact, a movable contact carried on said contact strip second end for cooperation with said first contact, an abutment carried by the mid-portion of said contact strip for abutment with the mid-portion of said bimetallic member main portion, an adjusting screw threadably carried on said base generally midway between said terminals, an insulator tip carried by said adjusting screw for abutting engagement with said bimetallic member main portion at a location substantially directly opposite said abutment, stop means coacting between said adjusting screw and said base to establish first and second rotational limit positions of said adjusting screw, a given rotational position of said adjusting screw establishing a dividing line between first and second adjustment ranges, said first adjustment range being between said given and said first rotational position and constituting an off condition with said contacts out of engagement despite temperature variations on said bimetallic member, said adjusting screw being operable throughout said second adjustment range to establish the operating temperature at which said contacts are moved by said bimetallic member to the closed condition, and said bimetallic member extension adapted to abut said contact strip at a location closely adjacent said movable contact within said adjustment range with temperature changes in a given sense.

16. A positive off thermostat, comprising, a base, first and second terminals insulatively mounted on said base, a stationary contact connected to said first terminal, an L-shaped bimetallic member having long and short legs, means for mounting the end of said long leg to said second terminal with said short leg in close proximity to said stationary contact, a flexible contact strip having first and second ends, means for mounting said strip first end to said second terminal with said strip second end extending toward said stationary contact, a movable contact carried on said strip second end for cooperation with said stationary contact, an abutment screw adjustably carried by the mid-portion of said contact strip for adjustable abutment with the mid-portion of said bimetallic member long leg, a manual adjusting screw threadably carried on said base generally midway between said terminals, an insulator tip carried by said adjusting screw for abutting engagement with said bimetallic member long leg at a location substantially directly opposite said abutment screw, stop means coacting between said adjusting screw and said base to establish first and second longitudinal limit positions of said adjusting screw, a given longitudinal position of said adjusting screw establishing a dividing line between first and second adjustment ranges, said first adjustment range being between said given and said first longitudinal position and constituting an off condition with said contacts out of engagement despite temperature variations on said bimetallic member, said manual adjusting screw being operable throughout said second adjustment range to establish the operating temperature at which said contacts are moved by said bimetallic member to the closed condition, and said bimetallic member short leg adapted to abut said contact strip at a location closely adjacent said movable contact within said second adjustment range with temperature changes in a given sense.

17. A positive off thermostat, comprising, an enclosing housing having an open end and a closed end, first and second terminals insulatively mounted through said closed end, a stationary contact connected to said first terminal within said housing, an L-shaped bimetallic member having long and short legs, means for mounting the end of said long leg to said second terminal within said housing and with said long leg extending longitudinally in said housing with said short leg in close proximity to said stationary contact, a flexible contact strip having first and second ends, means for mounting said strip first end to said second terminal within said housing and with said strip second end extending toward said stationary contact, a movable contact carried on said strip second end for cooperation with said stationary contact, an abutment screw adjustably carried by the mid-portion of said contact strip for adjustable abutment with the mid-portion of said bimetallic member long leg, a nut externally carried on the closed end of said housing generally midway between said terminals, a manual adjusting screw threadably carried in said nut with a first portion extending outside said housing and a second portion extending inside said housing, an insulator tip carried by said second portion for abutting engagement with said bimetallic member long leg at a location substantially directly opposite said abutment screw, top means coacting between said adjusting screw and said nut to establish first and second rotational limit positions of said adjusting screw, a given rotational position of said adjusting screw establishing a dividing line between first and second adjustment ranges, said first adjustment range being between said given and said first rotational position and constituting an off condition with said contacts out of engagement despite temperature variations on said bimetallic member, said manual adjusting screw being operable throughout said second adjustment range to establish the operating temperature at which said contacts are moved by said bimetallic member to the closed condition, and said bimetallic member short leg adapted to abut said contact strip at a location closely adjacent said movable contact within said second adjustment range with temperature changes in a given sense.

18. A condition responsive device comprising a base, an operating portion movably cooperating with said base, a movable condition responsive member, means for mounting said condition responsive member to said base, first means for adjustably moving said operating portion in a first direction, second means for moving said operating portion in the opposite direction, means for causing said condition responsive member to move said operating portion, and said first means having at least one adjustment position whereat said condition responsive member is ineffective to change the condition of said operating portion.

19. A condition responsive device comprising a base, an operating portion movably cooperating with said base, a movable condition responsive member, means for mounting said condition responsive member to said base, first means for adjustably moving said operating portion in a first direction, second means for moving said operating portion in the opposite direction, means for causing said condition responsive member to move said operating portion, said first means having at least one adjustment position whereat said condition responsive member is ineffective to change the condition of said operating portion, and said first means, said condition responsive member, and said operating portion so mutually cooperating that adjustment of said first means changes the relative position of said operating portion and said first means to vary the amount of deflection with condition variations of said condition responsive member required to operably move said operating portion.

20. A device, comprising, a base, a flexible member having first, second, and third portions, an operating portion carried on said flexible member third portion for cooperation with said base, a condition responsive member having first, second, and third portions, means for mounting both said first portions to said base, means for providing a cooperating relationship between said third portions for movement of said operating portion upon changes of said condition, first adjustable means operating on one of said member second portions for selecting the operating condition of said device, and second adjustable means operating on the second portion of the other of said members.

References Cited in the file of this patent

UNITED STATES PATENTS

| | | |
|---|---|---|
| 2,190,276 | Smith | Feb. 13, 1940 |
| 2,505,938 | Biermann et al. | May 2, 1950 |
| 2,557,810 | Bletz | June 19, 1951 |
| 2,634,350 | Mertler | Apr. 7, 1953 |